(No Model.) 3 Sheets—Sheet 1.
B. F. DARBY.
CORN PLANTER.
No. 520,669. Patented May 29, 1894.
Fig. 1
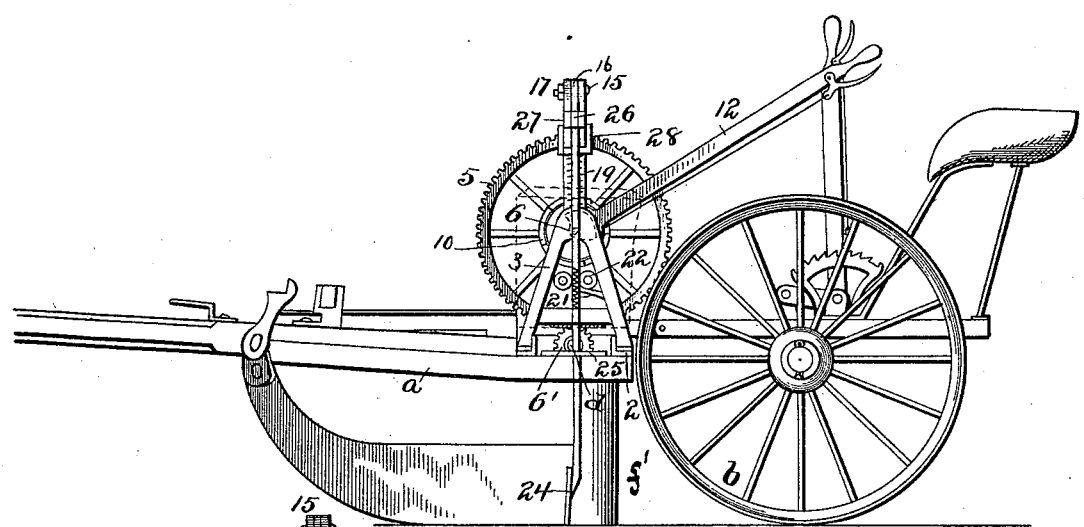
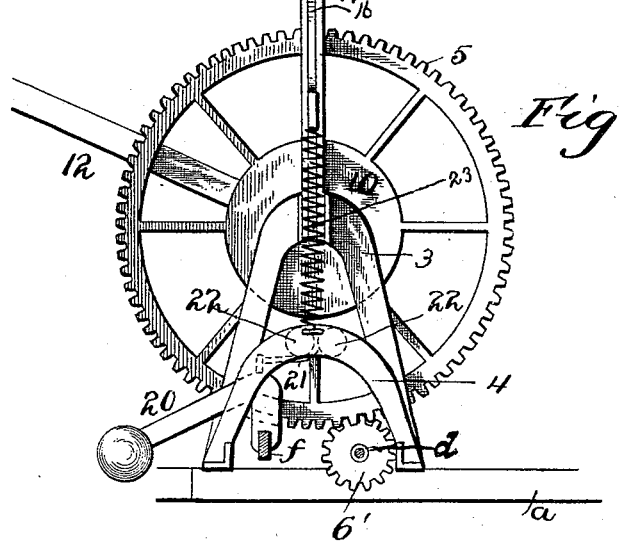
Fig. 5
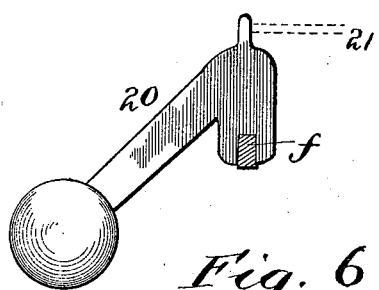
Fig. 6
Witnesses:
Inventor:
B. F. Darby (No Model.) 3 Sheets—Sheet 2.
B. F. DARBY.
CORN PLANTER.
No. 520,669. Patented May 29, 1894.
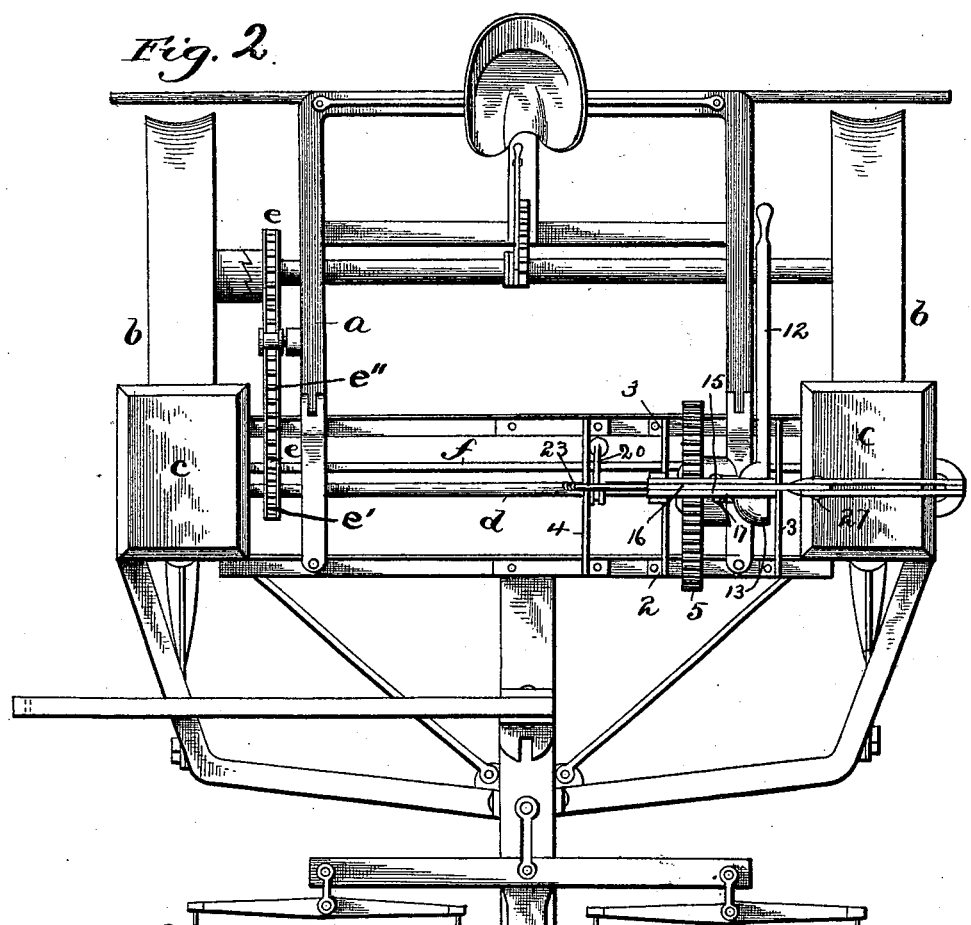
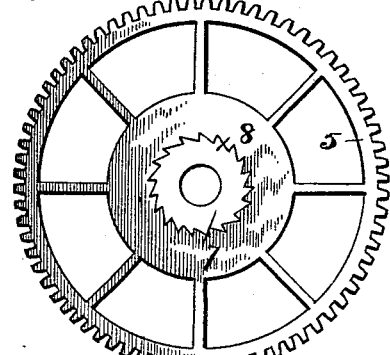
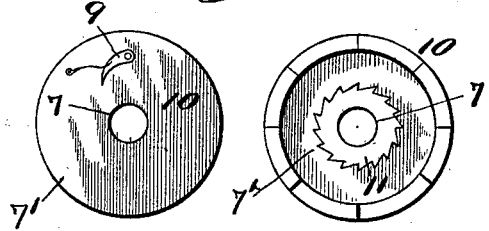
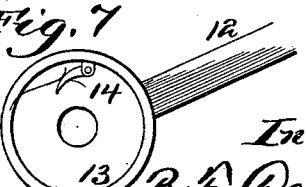
Witnesses:
J. B. McGirr.
Hubert D. Peck
Inventor:
B. F. Darby
per O. E. Duffy
Attorney (No Model.) 3 Sheets—Sheet 3.

B. F. DARBY.
CORN PLANTER.

No. 520,669. Patented May 29, 1894.

Witnesses:
J. B. McGirr
H. D. Peck

Inventor:
B. F. Darby

UNITED STATES PATENT OFFICE.

BENJAMIN FRANKLIN DARBY, OF CLAY'S PRAIRIE, ILLINOIS.

CORN-PLANTER.

SPECIFICATION forming part of Letters Patent No. 520,669, dated May 29, 1894.

Application filed September 2, 1893. Serial No. 484,677. (No model.)

*To all whom it may concern:*

Be it known that I, BENJAMIN FRANKLIN DARBY, of Clay's Prairie, in the county of Edgar and State of Illinois, have invented certain new and useful Improvements in Corn-Planters; and I do hereby declare that the following is a full, clear, and exact description of the invention, which will enable others skilled in the art to which it appertains to make and use the same, reference being had to the accompanying drawings, and to the letters and figures of reference marked thereon, which form part of this specification.

This invention relates to certain improvements in corn planters.

The object of the invention is to provide certain improvements in markers and actuating mechanisms for the seed dropping and marking mechanisms of a corn planter.

A further object of the invention is to provide certain cheap, simple and durable means for operating the corn dropping and marking mechanisms of a corn planter which will be constructed so that the parts can be set or reversed at any desired point by hand.

A further object of the invention is to provide a certain new and improved attachment for check row corn planters whereby the check wire and attachments operated thereby can be dispensed with and the machine can be operated by reason of said attachment in a new and improved manner and will mark the location of each hill.

The invention consists in certain novel features of construction and in combination of the parts more fully described hereinafter and particularly pointed out in the claims.

Figure 3:
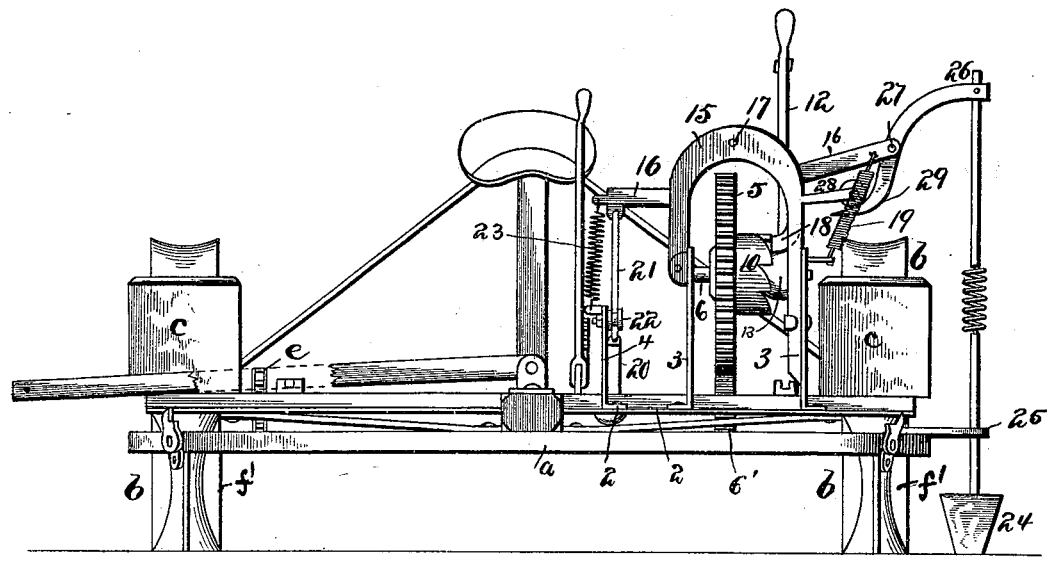
Figure 4:
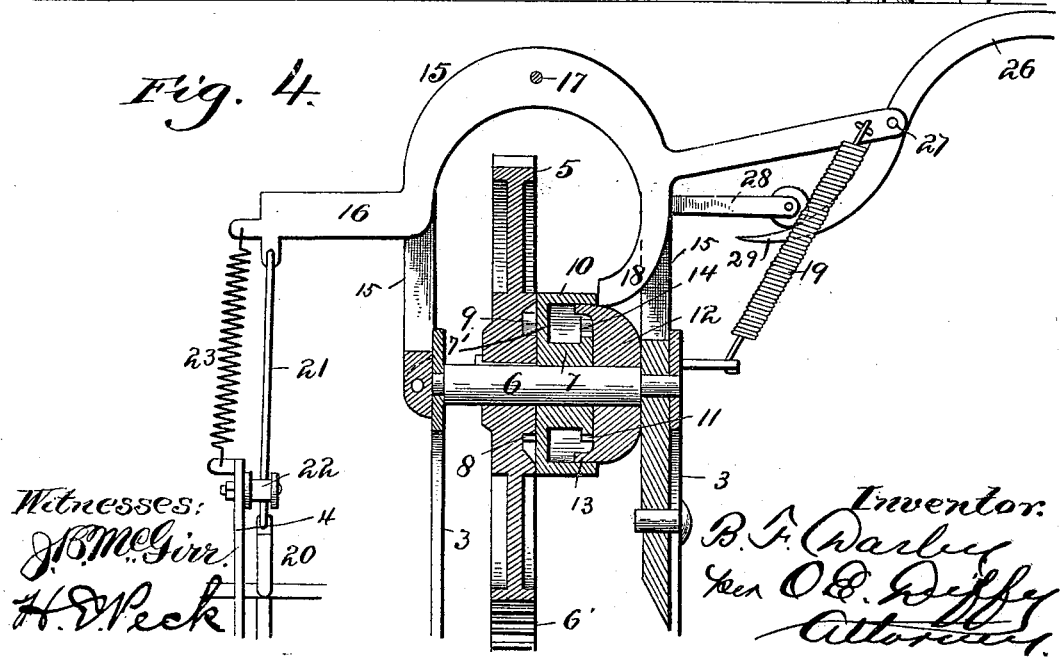

Referring to the accompanying drawings: Figure 1, is a side elevation of a corn planter provided with the present invention. Fig. 2, is a top plan view of a corn planter provided with my present improvement. Fig. 3, is a front view. Fig. 4 is a detail vertical sectional view, partially in elevation, of the main operating mechanism of the attachment. Fig. 5, is a detail view in side elevation of the construction shown in Fig. 4. Fig. 6, is a detail view of the weighted arm controlling the valve rod. Fig. 7, is a detail view of the inner end or head of the reversing or setting lever. Fig. 8, shows in elevation, opposite sides of the disk carrying the operating cams. Fig. 9, is a detail elevation of the main gear wheel of the attachment.

The ordinary check row planters are heavy and hard to operate because of the very heavy mechanisms necessary to operate the dropping mechanisms or valves from the buttons of the check wire and also because the very heavy check wire is partially supported by the planter as it moves across the fields.

It is the object of the invention to provide an improved attachment to the ordinary check row corn planter whereby the devices operated by the check buttons can be dispensed with and the dropping valves of the corn planter will be promptly operated and each hill marked, and the hills can be dropped at any particular point and each hill properly marked and the machine set at any point in the field to drop a hill where desired.

In the drawings the reference letter $a$, indicates the frame of an ordinary corn planter. $b$, is the supporting wheels thereof.

$c$, is the corn boxes.

$d$, is the rotary shaft extending into the corn boxes which operates the dropping mechanism not shown that regulates the number of kernels of corn for each hill.

$e$, is the gearing from one of the main wheels to said operating shaft; said gearing preferably consisting of a large sprocket wheel on a main driving wheel and a small sprocket wheel $e'$ on said shaft $d$, and a sprocket chain $e''$ connecting the same, so that the corn distributing mechanisms in the bottoms of the corn boxes are directly operated from the main drive wheels of the machine. $f$, is the valve controlling shaft which controls the ordinary valves or drops (not here shown) located in the boots or drills into which the corn from the corn boxes is dropped by the corn distributing mechanism not shown. A certain number of kernels of corn are dropped into the boots $f'$ and when such a number as desired for each hill has been deposited in the boot the valves are opened by the valve controlling rod, $f$, and the corn is dropped. The valve controlling rod is operated by mechanism hereinafter described. In the ordinary check row machine the said valve controlling rod is usually operated by and connected with the mechanism which is actuated by the buttons of the check wire.

My attachment or improvement which takes the place of the check wire and the mechanism operated by the buttons thereof comprises a supporting frame 2, suitably secured to the runner frame of the planter, preferably, between the corn boxes and over the rotary shaft *d*, controlling the corn distributing mechanism of the dropping apparatus; this frame 2, is preferably provided with two uprights 3, parallel with each other and located near together and also with the upright 4. The uprights 3, form supports for the large gear wheel 5, in which the shaft 6 of said gear wheel 5 is journaled to rotate. The large gear wheel 5, meshes with a small pinion 6', on shaft *d*, so that said large wheel 5, is driven from the main drive wheel of the machine.

A loose sleeve 7, is located on the shaft 6, and is provided with a disk 7' on one end carrying a spring pawl 9, arranged to engage with the ratchet wheel 8, rigid with the gear wheel 5, so that said sleeve 7, will turn with the gear wheel 5, when the gear wheel is turned in one direction and the sleeve 7, can be turned independently thereof in the opposite direction. This disk 7' just mentioned is provided with the series of laterally projecting cams 10, having the curved outer edges as shown in Fig. 8, forming a cam wheel. A suitable number of these cams are employed as hereinafter and fully described.

A small ratchet wheel 11 is located at the outer end of the sleeve 7. The teeth of the ratchet wheel 11 are arranged opposite to the teeth on the ratchet wheel 8. A reversing hand lever 12, provided with a disk shaped end 13, containing a spring pawl 14, is mounted on the end of the shaft 6, so that the pawl 14, in the concaved end 13, meshes with the ratchet wheel 11, so as to turn the sleeve 7, and the cams 10 as desired and when desired by rocking said lever. A suitably toothed segment, and hand clip therefor, may be provided to hold this lever 12, in the desired position.

A suitable U-shaped frame 15, is secured at its lower ends to the uprights 3 and extends upwardly over the large gear wheel 5. This frame is preferably composed of two plates suitably secured or confined together. A rocking lever 16, is mounted in said frame 15, so as to extend transversely above the gear wheel 5. This rocking lever 16, is fulcrumed in said frame 15, at the point 17 and extends laterally beyond the said frame and preferably one end of said lever extends over or beyond one of the seed boxes. Said rocking lever has a down turned nose 18 resting in engagement with the cams 10 of the sleeve 7 so that as the sleeve 7 is revolved said rocking lever will be rocked in a vertical plane by the nose 18 running up on the cams and dropping off the abrupt ends thereof as is evident. The spring 19, is connected with the outer end of the lever 16 to draw said end down and yieldingly hold the nose 18 in engagement with the cams 10. The inner end of the rocking lever 16, is connected to a weighted arm 20 extending laterally from the valve controlling rod by means of the flexible connections 21, extending down from said inner end of the rocking lever and between pulleys 22, on the upright 4 of the frame 2 laterally to a loop on said arm so that when said end of the lever is raised the connections 21, swing the arm 20, and rock the valve controlling rod and thereby operating the valves in the boots to drop the corn; the weighted arm 20, returning the parts to their normal positions. 23, is a light spring connected with the inner end of the rocking lever.

Having thus described the mechanism which operates and controls the corn distributing and dropping mechanism I will now describe the marking device and its operating connections.

24, indicates a vertically reciprocating marker bar extending down at the side of the machine and preferably beside a dropping boot or tube. This marker consists of a shovel and an upwardly extending shank passing through a guide 25. The upper end of the marker is pivotally joined to one or more lifting links or levers 26, fulcrumed at 27 to the outer end of the rocking lever 16 at a point between their ends so that their inwardly extending hook shaped ends 29 are located under and engaged by the horns or hook shaped projections 28, of the frame 15 so that the horns or projections 28 will resist upward pressure of the ends 29 of the lifter or levers 26. By this means a flexible or loose connection is formed between the marker and the rocking lever so that the marker has an independent upward movement permitting it to avoid or ride over obstruction and thereby avoid breakage or damage, as would be the case if rigid connections were employed between the marker and the rocker lever.

From the foregoing it will be seen that when the rocking lever is moved by each cam so as to operate the valve to drop the hills of corn the outer end of the rocking lever is moved down thereby throwing down the marker into engagement with the ground and marking the exact location of the hills. By reason of the peculiar loose connection between the marker and the rocking lever the marker is held sufficiently high when between the hills to prevent it engaging the ground or striking any obstruction and furthermore by reason of the peculiar connection the marker is moved suddenly and quickly and does not drag, but when making a stroke descends and rises quickly.

This device can be geared to drop any suitable number of hills in a given space located the desired distance apart. The number of hills dropped depends on the number of cams employed and the length of each cam.

In operation with a machine fitted up in accordance with my invention, when a field is desired to be planted a straight furrow is first plowed across one end of the field to start the planter in a straight line. The planter is then started at one end of the furrow, the cams being first turned by means of the hand setting lever 12 so as to drop a hill of corn and mark the same at the beginning of the row thus starting right with the hills beginning at one side of the field, then as the planter proceeds across the field the hills are planted and each hill is marked at the outer side of the frame. When the planter arrives on the opposite side of the field it is turned around and aligned with the hills previously planted by means of the row of marks, the operating mechanism is caused to drop a hill of corn by means of the hand lever and then the planter is started on the return trip. If the planter should meet with any obstructions in its passage across the field such as a large stone or a stump or the like it will pass around the same and when on the opposite side thereof the dropping mechanism can be operated by the hand lever so as to drop a hill of corn opposite the previously dropped hills so that the remainder of the hills will be properly aligned. It should be observed that the hand lever extends rearwardly so as to be in convenient reach of the driver, and that by means of the same and the ratchet connection between the same and the tubes carrying the cams the cams can be moved independently of the gear wheel and its driving mechanism to set the cams at any desired point and begin the hills of corn where desired.

This attachment can be placed on any ordinary check row planter and will properly operate the same, and dispense with the expensive heavy check wire or line and the mechanism operated by the same.

It is evident that various changes might be made in the forms, construction and arrangements of the parts described without departing from the spirit and scope of my invention, hence I do not wish to limit myself to the exact construction herein shown but consider myself entitled to all such changes that fall within the spirit and scope of my invention.

Having thus fully described my invention, what I claim as new, and desire to secure by Letters Patent of the United States, is—

1. In a corn planter, the combination of a support extending up from the frame of the planter, a vertically swinging lever mounted thereon and controlling the seed dropping mechanism of the planter, a marker controlled by said lever, a cam wheel, gearing arranged to drive said cam wheel, said cam wheel being connected to the gearing so as to move independently thereof, a hand lever connected with said cam wheel so as to move the cam wheel independently of said gearing, said lever having a nose arranged to be engaged by the cam wheel, so as to rock the lever, substantially as described.

2. In a corn planter, the combination of an upwardly extending support from the frame of the planter, a shaft mounted in said support, a gear wheel mounted on said shaft, a sleeve loosely mounted on said shaft and having a laterally extended cam wheel, said tube being connected to said shaft by a pawl and ratchet mechanism, a hand lever connected with said tube by a pawl and ratchet mechanism so as to move the tube independently of said gear wheel, a vertically swinging lever controlled by said cam wheel and controlling the seed dropping mechanism, a marker controlled by said lever, and actuating mechanism for driving the gear wheel, substantially as set forth.

3. In a corn planter, the vertically swinging lever, actuating mechanism therefor, a marker, and the loose link or lever connections between the marker and said vertically swinging lever so as to permit the marker to move independently of the lever and to give the marker a quick return movement, substantially as described.

4. In a corn planter, the vertically swinging lever, and means for actuating the same, a marker movable vertically, and a lifting link or lever at the outer end pivoted to the marker and between its ends pivoted to said lever and having the inner end arranged to engage a stationary stop as and for the purposes set forth.

5. In a corn planter, in combination the weighted arm extended laterally from the rocking valve rod, and a vertically movable lever connected with said arm and arranged to operate the same, and mechanism substantially as described for intermittingly rocking said lever, substantially as described.

6. In a corn planter, the combination of a vertically rocking lever, a reciprocating marker connected with one end of the lever, and controlled by the same, the rocking valve rod having a lateral arm connected with said lever and controlled by the same, a cam controlling the movement of said lever, and actuating mechanism for said cam, substantially as set forth.

7. In a corn planter, the combination of the supporting frame comprising the uprights, a shaft mounted in the uprights, a gear wheel on said shaft arranged vertically, actuating mechanism for said gear wheel, a tube loosely arranged on the shaft and connected with said gear wheel by a pawl and ratchet mechanism to prevent independent movement of the tube, said tube having a disk provided with a lateral cam wheel, means for moving said tube independently of the gear wheel, an upwardly extending frame above said gear wheel, a vertically rocking lever in said frame having the downwardly extending nose in engagement with said cam, a spring holding said nose in engagement with the cam, a reciprocating marker loosely connected to one end of said lever, a lateral arm from the valve rod of the planter loosely connected with the opposite end of said lever, substantially as described.

In testimony that I claim the foregoing as my own I affix my signature in presence of two witnesses.

BENJAMIN FRANKLIN DARBY.

Witnesses:
L. GUTZ,
J. C. RESSER.